US011655265B2

United States Patent
Liu et al.

(10) Patent No.: US 11,655,265 B2
(45) Date of Patent: *May 23, 2023

(54) METHOD FOR PREPARING L-GLUFOSINATE

(71) Applicants: Lier Chemical Co., Ltd., Sichuan (CN); Guangan Lier Chemical Co., Ltd., Sichuan (CN)

(72) Inventors: Yongjiang Liu, Sichuan (CN); Jie Cai, Sichuan (CN); Min Xu, Sichuan (CN); Tingying Liu, Sichuan (CN); Lei Zhou, Sichuan (CN); Wei Zeng, Sichuan (CN); Ke Cheng, Sichuan (CN); Yingsui Yin, Sichuan (CN)

(73) Assignees: Lier Chemical Co., Ltd., Sichuan (CN); Guangan Lier Chemical Co., Ltd, Sichuan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,410

(22) Filed: Jun. 15, 2022

(65) Prior Publication Data

US 2022/0324888 A1 Oct. 13, 2022

Related U.S. Application Data

(63) Continuation of application No. PCT/CN2021/107238, filed on Jul. 20, 2021.

(30) Foreign Application Priority Data

Oct. 14, 2020 (CN) .......................... 202011093594.7

(51) Int. Cl.
*C07F 9/30* (2006.01)
*C07F 9/48* (2006.01)
*C07F 9/50* (2006.01)
*C07F 9/535* (2006.01)
*C07F 9/6584* (2006.01)

(52) U.S. Cl.
CPC ............ *C07F 9/301* (2013.01); *C07F 9/4883* (2013.01); *C07F 9/5004* (2013.01); *C07F 9/535* (2013.01); *C07F 9/65844* (2013.01)

(58) Field of Classification Search
None
See application file for complete search history.

(56) References Cited

FOREIGN PATENT DOCUMENTS

| CN | 103396440 A | 11/2013 |
| CN | 105131032 A | 12/2015 |
| CN | 105218579 A | 6/2016 |
| CN | 109384811 A | 2/2019 |
| CN | 109912649 A | 6/2019 |
| CN | 111662324 A | 9/2020 |
| CN | 111662325 A | 9/2020 |
| CN | 111662326 A | 9/2020 |
| WO | WO 2020145514 A1 | 7/2020 |
| WO | WO 2020145627 A1 | 7/2020 |

OTHER PUBLICATIONS

Natchev, Ivan A. "Organophosphorus Analogs and Derivatives of the Natural L-Amino Carboxylic Acids and Peptides. I. Enzymic Synthesis of D-, DL-, and L-Phosphinothricin and Their Cyclic Analogs" Bulletin of the Chemical Society of Japan, vol. 61, No. 10, Oct. 31, 1988 (Oct. 31, 1988), ISSN: 0009-2673, pp. 3699-3704.
Natchev, Ivan A. "Total Synthesis and Enzyme-Substrate Interaction of D-, DL-, and L-Phosphinotricine, Bialaphos' (SF-1293) and Its Cyclic Analogs" Journal of the Chemical Society, Perkin Transactions 1: Organic and Bio-Organic Chemistry, No. 1, Dec. 31, 1989 (Dec. 31, 1989), ISSN: 0300-922X, pp. 125-131.
Examination report dated Jun. 10, 2022 in corresponding Australian patent application No. 2021360429.
Smith, Michael B., March's Advanced Organic Chemistry, Reactions, Mechanisms, and Structure (7th Ed.), John Wiley & Sons, Hoboken, New Jersey, 2013. On p. 1478.

*Primary Examiner* — Amy C Bonaparte
(74) *Attorney, Agent, or Firm* — Stites & Harbison PLLC; Richard S. Myers, Jr.

(57) ABSTRACT

Provided are a method for preparing L-glufosinate and the intermediate compounds of formula (V) and formula (III).

29 Claims, No Drawings

METHOD FOR PREPARING L-GLUFOSINATE

TECHNICAL FIELD

The present invention relates to a method for preparing L-glufosinate.

BACKGROUND ART

Glufosinate is a highly potent, broad-spectrum, low toxicity, non-selective (sterilant) organophosphorus herbicide with certain systemic action developed by Hoechst in the 1980s. It can control annual or perennial dicotyledon weeds and gramineae weeds. Glufosinate has two (L- and D-) enantiomers. The herbicidal activity of L-glufosinate is twice as potent as that of racemic DL-glufosinate.

Existing preparation methods have complex processes and high costs. Therefore, it is necessary to develop a low-cost method for preparing L-glufosinate.

DESCRIPTION OF THE INVENTION

The present invention provides a method for preparing L-glufosinate (I), comprising the following steps:

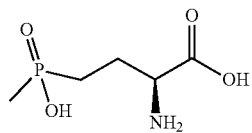
(I)

a) preparing a compound of Formula (III) from a compound of Formula (II), and

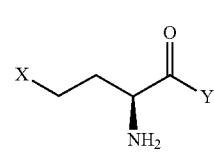
(II)

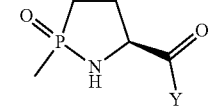
(III)

b) preparing L-glufosinate from the compound of Formula (III), wherein:
X is halogen;
Y is —OR$_1$ or —N(R$_2$)(R$_3$);
R$_1$, R$_2$ and R$_3$ are each independently substituted or unsubstituted alkyl having 1-6 carbon atoms, substituted or unsubstituted alkenyl having 1-6 carbon atoms (preferably, substituted or unsubstituted alkenyl having 2-6 carbon atoms), substituted or unsubstituted alkynyl having 1-6 carbon atoms (preferably, substituted or unsubstituted alkynyl having 2-6 carbon atoms), substituted or unsubstituted cycloalkyl having 3-10 carbon atoms, substituted or unsubstituted aryl having 6-20 carbon atoms, or substituted or unsubstituted heteroaryl having 2-10 carbon atoms, or —Si(R$_4$)(R$_5$)(R$_6$);

R$_4$, R$_5$ and R$_6$ are each independently substituted or unsubstituted alkyl having 1-6 carbon atoms, or substituted or unsubstituted aryl having 6-20 carbon atoms; and substituents for the alkyl, alkenyl, alkynyl, cycloalkyl, aryl and heteroaryl groups are each independently halogen, carboxyl (—COOH), amino (—NH$_2$), nitro (—NO$_2$), cyano (—CN), alkyl having 1-6 carbon atoms, aryl having 6-10 carbon atoms, or cycloalkyl having 3-10 carbon atoms.

Further, the above step a) comprises the following step c):
preparing a compound of Formula (V) by reacting the compound of Formula (II) with a compound of Formula (IV),

(IV)

(V)

wherein:
Hal is halogen;
X and Y are as defined above;
R$_7$ is hydrogen, substituted or unsubstituted alkyl having 1-6 carbon atoms, substituted or unsubstituted alkenyl having 1-6 carbon atoms (preferably, substituted or unsubstituted alkenyl having 2-6 carbon atoms), or substituted or unsubstituted alkynyl having 1-6 carbon atoms (preferably, substituted or unsubstituted alkynyl having 2-6 carbon atoms), and substituents for the alkyl, alkenyl and alkynyl groups are each independently halogen, carboxyl, amino, nitro, cyano, alkyl having 1-6 carbon atoms, aryl having 6-10 carbon atoms, or cycloalkyl having 3-10 carbon atoms.

In step c), the compound of Formula (IV) can be prepared in situ from a compound of Formula (VI) and a compound of Formula (VII), and then participate in the reaction, (VI)

(VII)

wherein Hal is halogen, and R$_7$ is as defined above.

In step c), the product can be successfully obtained in any feeding sequence. For example, the compound of Formula (II) may be added to the compound of Formula (IV), or the compound of Formula (IV) may be added to the compound of Formula (II).

In step c), the reaction may occur in the absence of a solvent or in the presence of an organic solvent, and the organic solvent may be selected from chlorobenzene.

In step c), the reaction may proceed smoothly with a salt (e.g., a hydrochloride) of the compound of Formula (II).

Further, the above step a) comprises a step d) of converting the compound of Formula (V) to the compound of Formula (III), after the step c).

Further, the above Y is —OR$_1$, and R$_1$ is methyl, ethyl, propyl (e.g., n-propyl, isopropyl), butyl (e.g., n-butyl, isobutyl or tert-butyl), amyl, hexyl, benzyl, phenyl or naphthyl, preferably ethyl, n-propyl, isopropyl or n-butyl, and more preferably ethyl.

Further, the above R$_7$ is methyl, ethyl, propyl, butyl, amyl or hexyl, preferably ethyl.

Further, in above step c), the reaction temperature is −30° C. to 30° C., e.g., −10° C. to 20° C., −10° to 10° C., and the preferred temperature is −10° C. The reaction time may be 0.1-20 hours.

Further, in above step c), the reaction temperature is −30° C. to 30° C.

Further, in above step c), the molar ratio of the compound of Formula (II) to the compound of Formula (IV) is 1:(0.5-10).

Further, the above step c) is performed in the presence of a base.

Further, the base used in above step c) is an organic base or ammonia.

Further, in above step c), the organic base is selected from the group consisting of organic amine, pyridine or a pyridine derivative having 1 to 3 substituents attached to one or more carbon atoms in the heterocycle, and piperidine or a piperidine derivative having 1 to 3 substituents attached to one or more carbon atoms in the heterocycle.

Further, in above step c), the organic base is selected from the group consisting of triethylamine, piperidine and pyridine.

Further, in above step c), the molar ratio of the compound of Formula (II) to the compound of Formula (IV) is 1:(0.5-10). Slightly excess (for example, an excess of 5% to 10%) of the compound of Formula (IV) is advantageous to the yield of the reaction.

Further, the above step d) comprises converting the compound of Formula (V) to the compound of Formula (III) at a temperature of 50° C. to 150° C. A temperature of 60° C. to 120° C. or 90° C. to 100° C. is preferred. The reaction time may be 0.5-40 hours.

Step d) may be performed in the presence of an organic solvent which is, for example, 1,4-dioxane, acetonitrile, 1,2-dichloroethane, tetrahydrofuran, or chlorobenzene, and the preferred organic solvent is chlorobenzene.

Further, the above step c) and step d) are a one-pot process, i.e., the intermediate compound of Formula (V) is not separated.

Further, the above step b) is performed by hydrolyzing the compound of Formula (III) in the presence of an acid catalyst.

Further, the acid catalyst is hydrochloric acid, acetic acid, or a Lewis acid.

Further, in above step b), the reaction temperature is 20° C. to 200° C. A temperature of 60° C. to 120° C. or 90° C. to 100° C. is preferred.

Further, the L-glufosinate has an enantiomeric excess (ee) value of greater than 50%.

Further, the L-glufosinate has an ee value of greater than 90%.

The method of the present invention is suitable for the preparation of L-glufosinate and can obtain L-glufosinate with a high optical purity at a high yield.

In some embodiments, the present invention provides a method for preparing L-glufosinate (I), characterized in that the method comprises a reaction of preparing the L-glufosinate (I) from a compound of Formula (III):

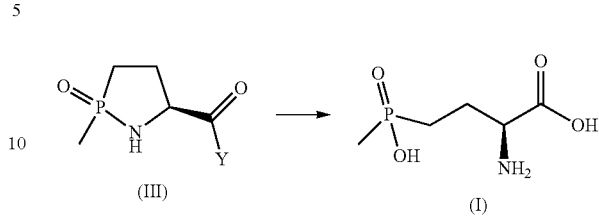

wherein Y is as defined above;

preferably, the reaction is performed through hydrolysis in the presence of an acid catalyst, and the acid catalyst is preferably hydrochloric acid, acetic acid, or a Lewis acid; and preferably, the reaction is performed at a temperature of 20° C. to 200° C.

In some embodiments, the present invention provides a compound of Formula (V),

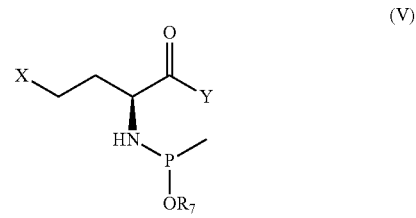

wherein:

X is halogen;

Y is —OR$_1$ or —N(R$_2$)(R$_3$);

R$_1$, R$_2$ and R$_3$ are each independently substituted or unsubstituted alkyl having 1-6 carbon atoms, substituted or unsubstituted alkenyl having 1-6 carbon atoms (preferably, substituted or unsubstituted alkenyl having 2-6 carbon atoms), substituted or unsubstituted alkynyl having 1-6 carbon atoms (preferably, substituted or unsubstituted alkynyl having 2-6 carbon atoms), substituted or unsubstituted cycloalkyl having 3-10 carbon atoms, substituted or unsubstituted aryl having 6-20 carbon atoms, or substituted or unsubstituted heteroaryl having 2-10 carbon atoms, or —Si(R$_4$)(R$_5$)(R$_6$);

R$_4$, R$_5$ and R$_6$ are each independently substituted or unsubstituted alkyl having 1-6 carbon atoms, or substituted or unsubstituted aryl having 6-20 carbon atoms;

R$_7$ is hydrogen, substituted or unsubstituted alkyl having 1-6 carbon atoms, substituted or unsubstituted alkenyl having 1-6 carbon atoms (preferably, substituted or unsubstituted alkenyl having 2-6 carbon atoms), or substituted or unsubstituted alkynyl having 1-6 carbon atoms (preferably, substituted or unsubstituted alkynyl having 2-6 carbon atoms);

substituents for the alkyl, alkenyl, alkynyl, cycloalkyl, aryl and heteroaryl groups are each independently halogen, carboxyl, amino, nitro, cyano, alkyl having 1-6 carbon atoms, aryl having 6-10 carbon atoms, or cycloalkyl having 3-10 carbon atoms; and preferably, the compound of Formula (V) is selected from the group consisting of:

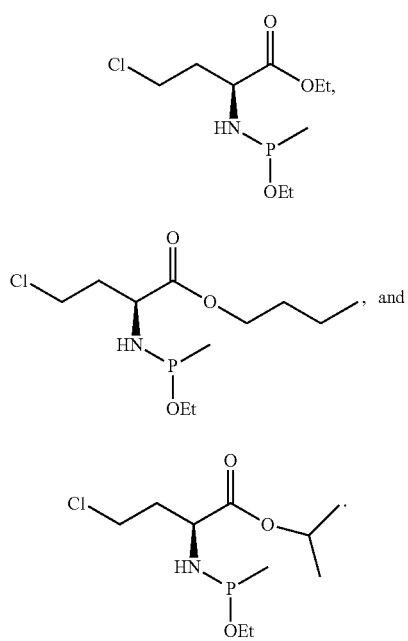

In some embodiments, the present invention provides a compound of Formula (III),

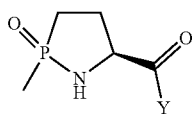 (III)

wherein:

Y is —OR$_1$ or —N(R$_2$)(R$_3$), provided that Y is not —OEt;

R$_1$, R$_2$ and R$_3$ are each independently substituted or unsubstituted alkyl having 1-6 carbon atoms, substituted or unsubstituted alkenyl having 1-6 carbon atoms (preferably, substituted or unsubstituted alkenyl having 2-6 carbon atoms), substituted or unsubstituted alkynyl having 1-6 carbon atoms (preferably, substituted or unsubstituted alkynyl having 2-6 carbon atoms), substituted or unsubstituted cycloalkyl having 3-10 carbon atoms, substituted or unsubstituted aryl having 6-20 carbon atoms, or substituted or unsubstituted heteroaryl having 2-10 carbon atoms, or —Si(R$_4$)(R$_5$)(R$_6$);

R$_4$, R$_5$ and R$_6$ are each independently substituted or unsubstituted alkyl having 1-6 carbon atoms, or substituted or unsubstituted aryl having 6-20 carbon atoms;

substituents for the alkyl, alkenyl, alkynyl, cycloalkyl, aryl and heteroaryl groups are each independently halogen, carboxyl, amino, nitro, cyano, alkyl having 1-6 carbon atoms, aryl having 6-10 carbon atoms, or cycloalkyl having 3-10 carbon atoms; and preferably, the compound of Formula (III) is selected from the group consisting of:

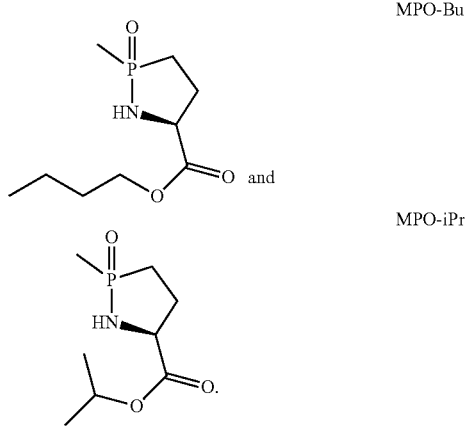

Definitions

Unless otherwise defined, all technical and scientific terms used herein are intended to have the same meaning as commonly understood by a person skilled in the art. References to techniques employed herein are intended to refer to the techniques as commonly understood in the art, including variations on those techniques or substitutions of equivalent techniques which would be apparent to a person skilled in the art. While it is believed that the following terms will be readily understood by a person skilled in the art, the following definitions are nevertheless put forth to better illustrate the present invention.

As used herein, the terms "contain", "include", "comprise", "have", or "relate to", as well as other variations used herein are inclusive or open-ended, and do not exclude additional, unrecited elements or method steps.

As used herein, the term "alkyl" is defined as linear or branched saturated aliphatic hydrocarbon. In some embodiments, alkyl has 1-12, e.g., 1-6 carbon atoms. For example, as used herein, the term "alkyl having 1-6 carbon atoms" refers to a linear or branched group having 1-6 carbon atoms (such as methyl, ethyl, n-propyl, isopropyl, n-butyl, isobutyl, sec-butyl, tert-butyl, n-amyl, isoamyl, neoamyl, or n-hexyl), which is optionally substituted with one or more (e.g., 1 to 3) suitable substituents such as halogen (at this time, this group is referred to as "haloalkyl") (e.g., CH$_2$F, CHF$_2$, CF$_3$, CCl$_3$, C$_2$F$_5$, C$_2$Cl$_5$, CH$_2$CF$_3$, CH$_2$Cl or —CH$_2$CH$_2$CF$_3$ etc.). The term "alkyl having 1-4 carbon atoms" refers to a linear or branched aliphatic hydrocarbon chain having 1-4 carbon atoms (i.e., methyl, ethyl, n-propyl, isopropyl, n-butyl, isobutyl, sec-butyl or tert-butyl).

As used herein, the term "alkenyl" refers to a linear or branched monovalent hydrocarbyl containing one or more double bonds and having 2 to 6 carbon atoms ("C$_{2-6}$ alkenyl"). The alkenyl is, for example, vinyl, 1-propenyl, 2-propenyl, 2-butenyl, 3-butenyl, 2-pentenyl, 3-pentenyl, 4-pentenyl, 2-hexenyl, 3-hexenyl, 4-hexenyl, 5-hexenyl, 2-methyl-2-propenyl and 4-methyl-3-pentenyl. When the compound of the present invention contains an alkenyl group, the compound may exist as the pure E (entgegen) form, the pure Z (zusammen) form, or any mixture thereof.

As used herein, the term "alkynyl" represents a monovalent hydrocarbyl containing one or more triple bonds and preferably having 2, 3, 4, 5 or 6 carbon atoms, for example, an ethynyl or propynyl.

As used herein, the term "cycloalkyl" refers to a saturated monocyclic or polycyclic (e.g., bicyclic) hydrocarbon ring (e.g., monocyclic, such as cyclopropyl, cyclobutyl, cyclopentyl, cyclohexyl, cycloheptyl, cyclooctyl, cyclononyl, or bicyclic, including spiro, fused or bridged cyclic system (such as bicyclo[1.1.1]pentyl, bicyclo[2.2.1]heptyl, bicyclo[3.2.1]octyl or bicyclo[5.2.0]nonyl, decahydronaphthalene, etc.)), which is optionally substituted with one or more (e.g., 1 to 3) suitable substituents. The cycloalkyl preferably has 3 to 10 carbon atoms. For example, the term "$C_{3-6}$ cycloalkyl" refers to a saturated monocyclic or polycyclic (e.g., bicyclic) hydrocarbon ring having 3 to 6 ring forming carbon atoms (e.g., cyclopropyl, cyclobutyl, cyclopentyl, or cyclohexyl), which is optionally substituted with one or more (e.g., 1 to 3) suitable substituents, e.g., methyl substituted cyclopropyl.

As used herein, the term "aryl" refers to an all-carbon monocyclic or fused-ring polycyclic aromatic group having a conjugated π electron system. For example, as used herein, the term "aryl having 6-20 carbon atoms" refers to an aromatic group containing 6 to 20 carbon atoms, such as phenyl or naphthyl. Aryl is optionally substituted with one or more (such as 1 to 3) suitable substituents (e.g., halogen, —OH, —CN, —NO$_2$, and $C_{1-6}$ alkyl).

As used herein, the term "heteroaryl" refers to a monovalent monocyclic, bicyclic or tricyclic aromatic ring system having 5, 6, 8, 9, 10, 11, 12, 13 or 14 ring atoms, particularly 1 or 2 or 3 or 4 or 5 or 6 or 9 or 10 carbon atoms, and containing at least one heteroatom (such as O, N, or S), which can be same or different. Moreover, in each case, it can be benzo-fused. In particular, heteroaryl is selected from the group consisting of thienyl, furyl, pyrrolyl, oxazolyl, thiazolyl, imidazolyl, pyrazolyl, isoxazolyl, isothiazolyl, oxadiazolyl, triazolyl, thiadiazolyl etc., and benzo derivatives thereof or pyridinyl, pyridazinyl, pyrimidinyl, pyrazinyl, triazinyl, etc., and benzo derivatives thereof.

As used herein, the term "halogen" is defined to include F, Cl, Br, or I.

As used herein, the term "substituted" means that one or more (e.g., one, two, three, or four) hydrogens on a designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds.

EXAMPLES

Chlorohomoserine alkyl esters used in the following examples may be prepared by a method similar to that disclosed in CN110845347A. The remaining reagents (e.g., MDP and MDEP) are all commercially available.

Example 1

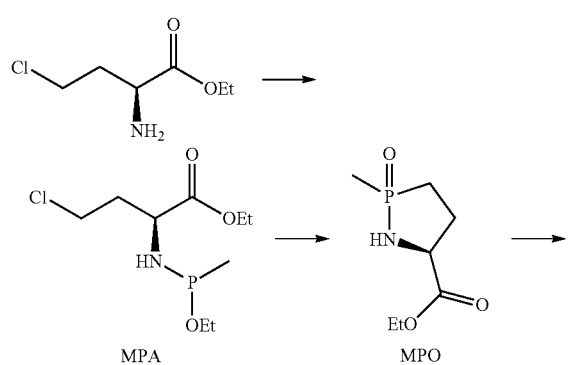

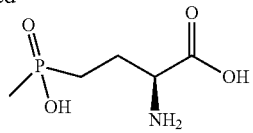

(1) Preparation of MCP

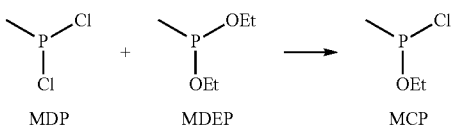

A solution of diethyl methylphosphonite (MDEP, 68.8 g, 455.4 mmol, 0.53 eq, and a purity of 90%) in chlorobenzene (300 g) was added to a round-bottom flask under nitrogen atmosphere at −10° C., and a solution of dichloro(methyl)phosphane (MDP, 54.4 g, 455.4 mmol, 0.53 eq, and a purity of 98%) in chlorobenzene (200 g) was added dropwise through a constant-pressure funnel at a dripping rate of 1 d/s. After the dropwise addition was completed, stirring was continued for 10 minutes, thereby to obtain a first intermediate MCP.

$^1$H NMR (D$_2$O external standard, 43 MHz) δ: 3.92-2.96 (m, 2H), 1.31 (d, J=12.8 Hz, 3H), 0.84 (t, J=7.0 Hz, 3H).

(2) Preparation of MPA

Without separation, a solution of chlorohomoserine ethyl ester (150 g, 867.5 mmol, 1.0 eq, a purity of 96%, and an ee value of 99%) and triethylamine (107.5 g, 1041 mmol, 1.2 eq, and a purity of 98%) in chlorobenzene (500 g) was added dropwise thereto at a dripping rate of 4 d/s. After the dropwise addition was completed, stirring was continued for 30 minutes, followed by warming to room temperature and stirring for 1 hour. GC and MS detection indicated the reaction of the starting material chlorohomoserine ethyl ester was complete, and a second intermediate MPA was obtained.

(3) Preparation of MPO

Without separation, the reaction solution was warmed to 90° C., and the reaction was allowed to proceed for 12 hours. The mixture was naturally cooled to room temperature, and filtered with suction. The filter cake was washed with chlorobenzene (150 mL×3), and the filtrate was rotary evaporated to remove chlorobenzene, thereby obtaining MPO.

(4) Preparation of L-Glufosinate Hydrochloride 100 mL of concentrated hydrochloric acid (36%) was added to the MPO, heated to 90° C., and the reaction was allowed to proceed for 10 hours. The solvent was removed by rotary evaporation, 200 mL of concentrated hydrochloric acid (36%) was supplemented, and the reaction was continued at 90° C. for 10 hours. MS indicated the intermediate disappeared. The reaction mixture was allowed to naturally cool to room temperature and the solvent was removed by rotary evaporation. The mixture was then added with 95% ethanol (300 mL), refluxed until the crude product was completely dissolved, followed by naturally cooling and crystallizing, filtering, and drying, thereby obtaining L-glufosinate hydrochloride (white crystal, 126.3 g L-glufosinate, yield: 80%, and 97% ee).

Data for characterizing the structure of the product are shown below:

MS (ESI): m/z [M+H]$^+$ calcd for $C_5H_{13}NO_4P$: 182.06; found: 182.1.

$^1$H NMR (D$_2$O, 400 MHz) δ: 4.08 (t, J=6.2 Hz, 1H), 2.11 (dddd, J=14.6, 11.0, 8.7, 6.0 Hz, 2H), 1.99-1.73 (m, 2H), 1.44 (d, J=14.2 Hz, 3H).

$^{13}$C NMR (D$_2$O, 100 MHz) δ: 171.0, 52.8, 52.6, 25.5, 24.6, 22.6, 22.5, 13.9, 13.0.

Example 2

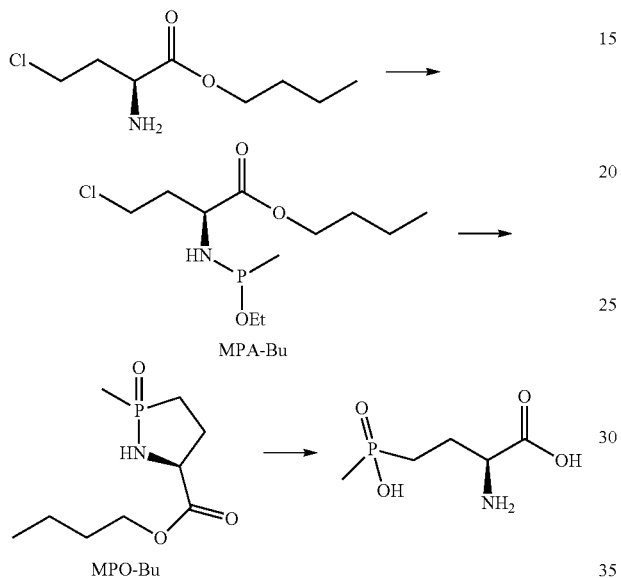

(1) Preparation of MCP

MCP was prepared by the same method as described in step (1) of Example 1.

(2) Preparation of MPA-Bu

Without separation, a solution of chlorohomoserine butyl ester (178.7 g, 867.5 mmol, 1.0 eq, a purity of 94%, and an ee value of 99%) and triethylamine (107.5 g, 1041 mmol, 1.2 eq, and a purity of 98%) in chlorobenzene (500 g) was added dropwise thereto at a dripping rate of 4 d/s. After the dropwise addition was completed, stirring was continued for 30 minutes, followed by warming to room temperature and stirring for 1 hour. GC and MS detection indicated the reaction of the starting material chlorohomoserine butyl ester was complete, and a second intermediate MPA-Bu was obtained.

MS (ESI): m/z [M+H]$^+$ calcd for $C_{11}H_{24}ClNO_3P$: 284.12; found: 284.1.

(3) Preparation of MPO-Bu

Without separation, the reaction solution was warmed to 90° C., and the reaction was allowed to proceed for 12 hours. The mixture was naturally cooled to room temperature, and filtered with suction. The filter cake was washed with chlorobenzene (150 mL×3), and the filtrate was rotary evaporated to remove chlorobenzene, thereby obtaining MPO-Bu.

MS (ESI): m/z [M+H]$^+$ calcd for $C_9H_{19}NO_3P$: 220.11; found: 220.1.

$^1$H NMR (400 MHz, CDCl$_3$) δ 4.15 (dtd, J=17.1, 11.0, 6.6 Hz, 2H), 4.01 (d, J=5.7 Hz, 1H), 2.47-2.05 (m, 2H), 1.71-1.58 (m, 4H), 1.35 (h, J=7.4 Hz, 2H), 1.23 (d, J=13.5 Hz, 3H), 0.91 (t, J=7.4 Hz, 3H).

$^{13}$C NMR (100 MHz, CDCl$_3$) δ 169.9, 65.9, 53.1, 30.6, 28.4, 24.2, 19.1, 16.4, 13.8.

$^{31}$P NMR (160 MHz, CDCl$_3$) δ 37.8.

(4) Preparation of L-Glufosinate Hydrochloride 100 mL of concentrated hydrochloric acid (36%) was added to the MPO-Bu, heated to 90° C., and the reaction was allowed to proceed for 10 hours. The solvent was removed by rotary evaporation, 200 mL of concentrated hydrochloric acid (36%) was supplemented, and the reaction was continued at 90° C. for 10 hours. MS indicated the intermediate disappeared. The reaction mixture was allowed to naturally cool to room temperature and the solvent was removed by rotary evaporation. The mixture was then added with 95% ethanol (300 mL), refluxed until the crude product was completely dissolved, followed by naturally cooling and crystallizing, filtering, and drying, thereby obtaining L-glufosinate hydrochloride (white crystal, 119.4 g L-glufosinate, yield: 76%, and 95% ee).

Data for characterizing the structure of the product are shown below:

MS (ESI): m/z [M+H]$^+$ calcd for $C_5H_{13}NO_4P$: 182.06; found: 182.1.

$^1$H NMR (400 MHz, D$_2$O) δ: 4.08 (t, J=6.2 Hz, 1H), 2.11 (dddd, J=14.6, 11.0, 8.7, 6.0 Hz, 2H), 1.99-1.73 (m, 2H), 1.44 (d, J=14.2 Hz, 3H).

$^{13}$C NMR (400 MHz, D$_2$O) δ: 171.0, 52.8, 52.6, 25.5, 24.6, 22.6, 22.5, 13.9, 13.0.

Example 3

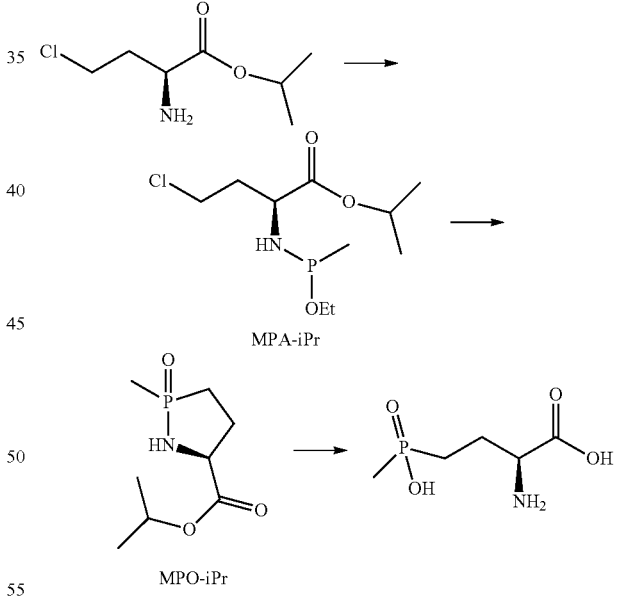

(1) Preparation of MCP

MCP was prepared by the same method as described in step (1) of Example 1. (2) Preparation of MPA-iPr Without separation, a solution of chlorohomoserine isopropyl ester (81.8 g, 433.8 mmol, 1.0 eq, a purity of 95%, and an ee value of 99%) and triethylamine (53.8 g, 520.5 mmol, 1.2 eq, and a purity of 98%) in chlorobenzene (500 g) was added dropwise thereto at a dripping rate of 4 d/s. After the dropwise addition was completed, stirring was continued for 30 minutes, followed by warming to room temperature and stirring for 1 hour. GC and MS detection indicated the reaction of the starting material chlorohomoserine isopropyl ester was complete, and a second intermediate MPA-iPr was obtained.

MS (ESI): m/z [M+H]$^+$ calcd for $C_{10}H_{22}ClNO_3P$: 270.10; found: 270.1.

(3) Preparation of MPO-iPr

Without separation, the reaction solution was warmed to 90° C., and the reaction was allowed to proceed for 12 hours. The mixture was naturally cooled to room temperature, and filtered with suction. The filter cake was washed with chlorobenzene (150 mL×3), and the filtrate was rotary evaporated to remove chlorobenzene, thereby obtaining MPO-iPr.

MS (ESI): m/z [M+H]$^+$ calcd for $C_8H_{16}NO_3P$: 206.09; found: 206.1.

$^1$H NMR (400 MHz, CDCl$_3$) δ 4.99-4.90 (m, 1H), 4.10 (ddd, J=10.8, 7.3, 3.8 Hz, 1H), 3.63 (d, J=11.5 Hz, 1H), 2.50-2.38 (m, 1H), 2.14-2.02 (m, 1H), 1.84 (ddd, J=14.3, 7.7, 4.7 Hz, 1H), 1.77-1.67 (m, 4H), 1.20-1.18 (m, 6H).

$^{31}$P NMR (160 MHz, CDCl$_3$) δ 54.4.

(4) Preparation of L-Glufosinate Hydrochloride 100 mL of concentrated hydrochloric acid (36%) was added to the MPO-iPr, heated to 90° C., and the reaction was allowed to proceed for 10 hours. The solvent was removed by rotary evaporation, 100 mL of concentrated hydrochloric acid (36%) was supplemented, and the reaction was continued at 90° C. for 10 hours. MS indicated the intermediate disappeared. The reaction mixture was allowed to naturally cool to room temperature and the solvent was removed by rotary evaporation. The mixture was then added with 95% ethanol (150 mL), refluxed until the crude product was completely dissolved, followed by naturally cooling and crystallizing, filtering, and drying, thereby obtaining L-glufosinate hydrochloride (white crystal, 64.4 g L-glufosinate, yield: 82%, and 99% ee).

In addition to those described herein, according to the foregoing description, various modifications to the present invention would be apparent to those skilled in the art. Such modifications are intended to fall within the scope of the appended claims. Each reference cited herein (including all patents, patent applications, journal articles, books and any other disclosures) are incorporated herein by reference in its entirety.

We claim:

1. A method for preparing L-glufosinate (I), wherein the method comprises the following steps:

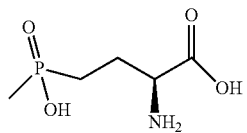
(I)

a) preparing a compound of Formula (III) from a compound of Formula (II), and

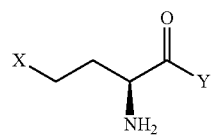
(II)

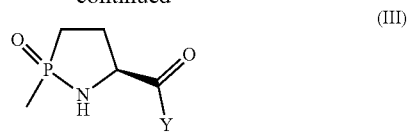
(III)

b) preparing L-glufosinate from the compound of Formula (III), wherein:

X is halogen;

Y is —OR$_1$ or —N(R$_2$)(R$_3$);

R$_1$, R$_2$ and R$_3$ are each independently substituted or unsubstituted alkyl having 1-6 carbon atoms, substituted or unsubstituted alkenyl having 2-6 carbon atoms, substituted or unsubstituted alkynyl having 2-6 carbon atoms, substituted or unsubstituted cycloalkyl having 3-10 carbon atoms, substituted or unsubstituted aryl having 6-20 carbon atoms, substituted or unsubstituted heteroaryl having 2-10 carbon atoms, or —Si(R$_4$)(R$_5$)(R$_6$);

R$_4$, R$_5$ and R$_6$ are each independently substituted or unsubstituted alkyl having 1-6 carbon atoms, or substituted or unsubstituted aryl having 6-20 carbon atoms; and substituents for the alkyl, alkenyl, alkynyl, cycloalkyl, aryl and heteroaryl groups are each independently halogen, carboxyl, amino, nitro, cyano, alkyl having 1-6 carbon atoms, aryl having 6-10 carbon atoms, or cycloalkyl having 3-10 carbon atoms.

2. The method according to claim 1, wherein the step a) comprises the following step c):

preparing a compound of Formula (V) by reacting the compound of Formula (II) with a compound of Formula (IV),

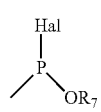
(IV)

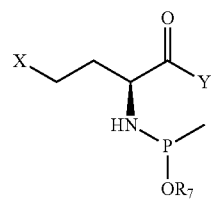
(V)

wherein:

Hal is halogen;

X and Y are as defined in claim 1;

R$_7$ is hydrogen, substituted or unsubstituted alkyl having 1-6 carbon atoms, substituted or unsubstituted alkenyl having 2-6 carbon atoms, or substituted or unsubstituted alkynyl having 2-6 carbon atoms, and substituents for the alkyl, alkenyl and alkynyl groups are each independently halogen, carboxyl, amino, nitro, cyano, alkyl having 1-6 carbon atoms, aryl having 6-10 carbon atoms, or cycloalkyl having 3-10 carbon atoms.

3. The method according to claim 2, wherein the step a) comprises a step d) of converting the compound of Formula (V) to the compound of Formula (III), after the step c).

4. The method according to claim 1, wherein the Y is —OR$_1$, and R$_1$ is methyl, ethyl, n-propyl, isopropyl, n-butyl, isobutyl, tert-butyl, amyl, hexyl, benzyl, phenyl or naphthyl.

5. The method according to claim 2, wherein the R$_7$ is methyl, ethyl, propyl, butyl, amyl or hexyl.

6. The method according to claim 2, wherein in the step c), the reaction temperature is −30° C. to 30° C.

7. The method according to claim 2, wherein in the step c), the molar ratio of the compound of Formula (II) to the compound of Formula (IV) is 1:0.5 to 1:10.

8. The method according to claim 2, wherein the step c) is performed in the presence of a base.

9. The method according to claim 8, wherein the base used in the step c) is an organic base or ammonia.

10. The method according to claim 9, wherein in the step c), the organic base is selected from the group consisting of organic amine, pyridine or a pyridine derivative having 1 to 3 substituents attached to one or more carbon atoms in the heterocycle, and piperidine or a piperidine derivative having 1 to 3 substituents attached to one or more carbon atoms in the heterocycle.

11. The method according to claim 10, wherein the organic base is selected from the group consisting of triethylamine, piperidine, and pyridine.

12. The method according to claim 3, wherein in the step d), the compound of Formula (V) is converted to the compound of Formula (III) at a temperature of 50° C. to 150° C.

13. The method according to claim 3, wherein the step c) and the step d) are a one-pot process.

14. The method according to claim 1, wherein the step b) is performed by hydrolyzing the compound of Formula (III) in the presence of an acid catalyst.

15. The method according to claim 14, wherein the acid catalyst is hydrochloric acid, acetic acid, or a Lewis acid.

16. The method according to claim 1, wherein in the step b), the reaction temperature is 20° C. to 200° C.

17. The method according to claim 1, wherein the L-glufosinate has an enantiomeric excess (ee) value of greater than 50%.

18. The method according to claim 17, wherein the L-glufosinate has an ee value of greater than 90%.

19. A method for preparing L-glufosinate (I), wherein the method comprises a reaction of preparing the L-glufosinate (I) from a compound of Formula (III):

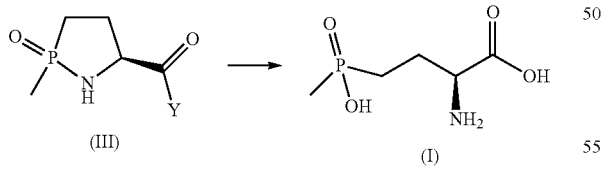

wherein Y is —OR$_1$ or —N(R$_2$)(R$_3$);

R$_1$, R$_2$, and R$_3$ are each independently substituted or unsubstituted alkyl having 1-6 carbon atoms, substituted or unsubstituted alkenyl having 2-6 carbon atoms, substituted or unsubstituted alkynyl having 2-6 carbon atoms, substituted or unsubstituted cycloalkyl having 3-10 carbon atoms, substituted or unsubstituted aryl having 6-20 carbon atoms, substituted or unsubstituted heteroaryl having 2-10 carbon atoms, or —Si(R$_4$)(R$_5$)(R$_6$);

R$_4$, R$_5$, and R$_6$ are each independently substituted or unsubstituted alkyl having 1-6 carbon atoms, or substituted or unsubstituted aryl having 6-20 carbon atoms; and substituents for the alkyl, alkenyl, alkynyl, cycloalkyl, aryl and heteroaryl groups are each independently halogen, carboxyl, amino, nitro, cyano, alkyl having 1-6 carbon atoms, aryl having 6-10 carbon atoms, or cycloalkyl having 3-10 carbon atoms.

20. A compound, wherein:
the compound is of Formula (V),

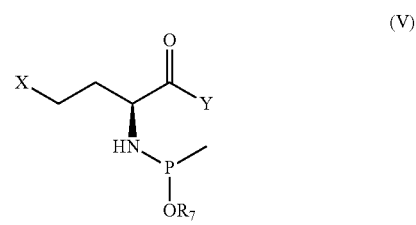

wherein:

X is halogen;

Y is —OR$_1$ or —N(R$_2$)(R$_3$);

R$_1$, R$_2$ and R$_3$ are each independently substituted or unsubstituted alkyl having 1-6 carbon atoms, substituted or unsubstituted alkenyl having 2-6 carbon atoms, substituted or unsubstituted alkynyl having 2-6 carbon atoms, substituted or unsubstituted cycloalkyl having 3-10 carbon atoms, substituted or unsubstituted aryl having 6-20 carbon atoms, substituted or unsubstituted heteroaryl having 2-10 carbon atoms, or —Si(R$_4$)(R$_5$)(R$_6$);

R$_4$, R$_5$ and R$_6$ are each independently substituted or unsubstituted alkyl having 1-6 carbon atoms, or substituted or unsubstituted aryl having 6-20 carbon atoms;

R$_7$ is hydrogen, substituted or unsubstituted alkyl having 1-6 carbon atoms, substituted or unsubstituted alkenyl having 2-6 carbon atoms, or substituted or unsubstituted alkynyl having 2-6 carbon atoms;

substituents for the alkyl, alkenyl, alkynyl, cycloalkyl, aryl and heteroaryl groups are each independently halogen, carboxyl, amino, nitro, cyano, alkyl having 1-6 carbon atoms, aryl having 6-10 carbon atoms, or cycloalkyl having 3-10 carbon atoms;

or, the compound is of Formula (III),

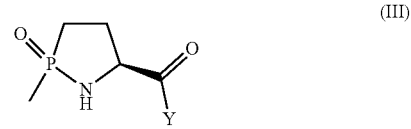

wherein:

Y is —OR$_1$ or —N(R$_2$)(R$_3$), provided that Y is not —OEt;

R$_1$, R$_2$ and R$_3$ are each independently substituted or unsubstituted alkyl having 1-6 carbon atoms, substituted or unsubstituted alkenyl having 2-6 carbon atoms, substituted or unsubstituted alkynyl having 2-6 carbon atoms, substituted or unsubstituted cycloalkyl having 3-10 carbon atoms, substituted or unsubstituted aryl having 6-20 carbon atoms, substituted or unsubstituted heteroaryl having 2-10 carbon atoms, or —Si($R_4$)($R_5$)($R_6$);

$R_4$, $R_5$ and $R_6$ are each independently substituted or unsubstituted alkyl having 1-6 carbon atoms, or substituted or unsubstituted aryl having 6-20 carbon atoms;

substituents for the alkyl, alkenyl, alkynyl, cycloalkyl, aryl and heteroaryl groups are each independently halogen, carboxyl, amino, nitro, cyano, alkyl having 1-6 carbon atoms, aryl having 6-10 carbon atoms, or cycloalkyl having 3-10 carbon atoms.

21. A method for preparing a compound of Formula (III), wherein the method comprises preparing a compound of Formula (III) from a compound of Formula (II),

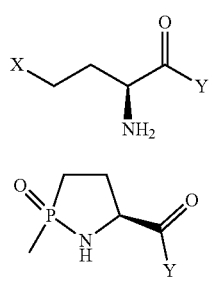

(II)

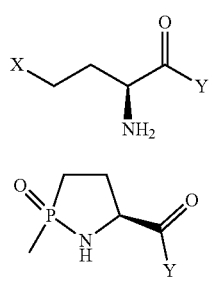

(III)

wherein:

X is halogen;

Y is —$OR_1$ or —N($R_2$)($R_3$);

$R_1$, $R_2$ and $R_3$ are each independently substituted or unsubstituted alkyl having 1-6 carbon atoms, substituted or unsubstituted alkenyl having 2-6 carbon atoms, substituted or unsubstituted alkynyl having 2-6 carbon atoms, substituted or unsubstituted cycloalkyl having 3-10 carbon atoms, substituted or unsubstituted aryl having 6-20 carbon atoms, substituted or unsubstituted heteroaryl having 2-10 carbon atoms, or —Si($R_4$)($R_5$)($R_6$);

$R_4$, $R_5$ and $R_6$ are each independently substituted or unsubstituted alkyl having 1-6 carbon atoms, or substituted or unsubstituted aryl having 6-20 carbon atoms; and substituents for the alkyl, alkenyl, alkynyl, cycloalkyl, aryl and heteroaryl groups are each independently halogen, carboxyl, amino, nitro, cyano, alkyl having 1-6 carbon atoms, aryl having 6-10 carbon atoms, or cycloalkyl having 3-10 carbon atoms.

22. The method according to claim 21, wherein the method comprises preparing a compound of Formula (V) by reacting the compound of Formula (II) with a compound of Formula (IV),

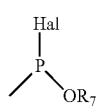

(IV)

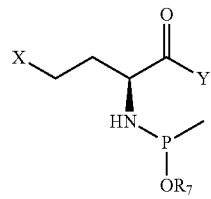

(V)

wherein:

Hal is halogen;

X and Y are as defined in claim 21;

$R_7$ is hydrogen, substituted or unsubstituted alkyl having 1-6 carbon atoms, substituted or unsubstituted alkenyl having 2-6 carbon atoms, or substituted or unsubstituted alkynyl having 2-6 carbon atoms, and substituents for the alkyl, alkenyl and alkynyl groups are each independently halogen, carboxyl, amino, nitro, cyano, alkyl having 1-6 carbon atoms, aryl having 6-10 carbon atoms, or cycloalkyl having 3-10 carbon atoms.

23. The method according to claim 22, wherein the method comprises a step of converting the compound of Formula (V) to the compound of Formula (III), after the compound of Formula (V) is prepared.

24. The method of claim 16, wherein in the step b), the reaction temperature is 60° C. to 120° C. or 90° C. to 100° C.

25. The method of claim 19, wherein the reaction is performed through hydrolysis in the presence of an acid catalyst.

26. The method of claim 25, wherein the acid catalyst is hydrochloric acid, acetic acid, or a Lewis acid.

27. The method of claim 19, wherein the reaction is performed at a temperature of 20° C. to 200° C.

28. The method of claim 20, wherein the compound of Formula (V) is selected from the group consisting of:

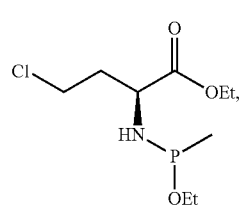

MPA

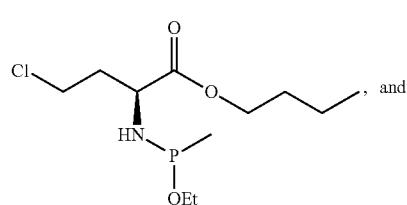

MPA-Bu

, and

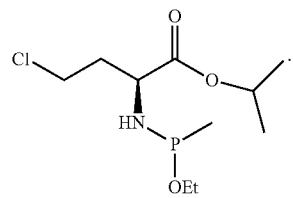

MPA-iPr

.

29. The method of claim 20, wherein the compound of Formula (III) is selected from the group consisting of:
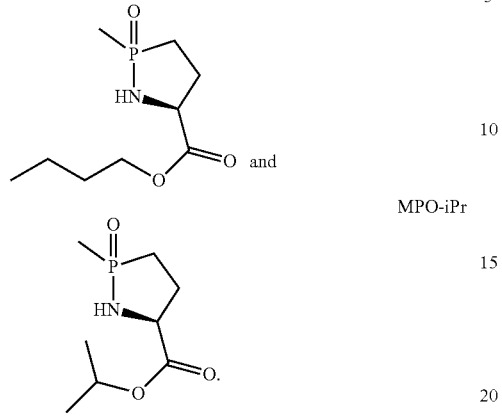
MPO-Bu
and
MPO-iPr
* * * * *

UNITED STATES PATENT AND TRADEMARK OFFICE
CERTIFICATE OF CORRECTION

PATENT NO. : 11,655,265 B2
APPLICATION NO. : 17/841410
DATED : May 23, 2023
INVENTOR(S) : Liu et al.

It is certified that error appears in the above-identified patent and that said Letters Patent is hereby corrected as shown below:

In the Claims

In Claim 28, Line 1, replace "method" with --compound--.

In Claim 29, Line 1, replace "method" with --compound--.

Signed and Sealed this
Fifth Day of December, 2023

Katherine Kelly Vidal
*Director of the United States Patent and Trademark Office*